United States Patent [19]

Gehmann

[11] 4,392,723
[45] Jul. 12, 1983

[54] AIMING DEVICE

[76] Inventor: Walter Gehmann, Karlstrasse 40, Karlsruhe, Fed. Rep. of Germany, 7500

[21] Appl. No.: 227,606

[22] Filed: Jan. 23, 1981

[30] Foreign Application Priority Data

Feb. 8, 1980 [DE] Fed. Rep. of Germany ........ 3004635

[51] Int. Cl.³ .............................................. F41G 1/14
[52] U.S. Cl. ................................... 350/407; 350/266; 33/243; 33/251
[58] Field of Search ....................... 350/266, 406, 407; 33/233, 243, 251

[56] References Cited

U.S. PATENT DOCUMENTS

| 807,712 | 12/1905 | Bassell et al. | 33/251 |
|---|---|---|---|
| 1,198,888 | 9/1916 | Bullen | 33/251 |
| 3,456,351 | 7/1969 | Gehmann | 350/266 |

FOREIGN PATENT DOCUMENTS

| 69558 | 7/1893 | Fed. Rep. of Germany | 33/233 |
|---|---|---|---|
| 588646 | 8/1947 | United Kingdom | 33/257 |

Primary Examiner—R. A. Rosenberger
Attorney, Agent, or Firm—Klaus J. Bach; Klaus J. Bach

[57] ABSTRACT

An aiming device has arranged in a tubular housing an adjustable iris diaphragm, a polarizing filter and a number of color filters. The color filters are mounted on a filter disc which is rotatably supported in the housing and provided with circumferential gear ring engaged by internal gearing of a knurled ring surrounding the housing. The polarizing filters are supported on arms with which they can be pivoted out of the line of sight of the view finder and by which they can be rotated relative to each other when they are in the line of sight of the view finder. A second knurled operating ring engages the polarizing filter support arms for actuation thereof. The iris diaphragm consists of a slotted sleeve having a conical end disposed in a conical cavity of the housing. A knurled third ring is threaded onto the housing and engages the sleeve for forcing it into the conical cavity for reducing the open diameter of the iris diaphragm. The three knurled rings are disposed adjacent each other and surround the housing, the intermediate ring being preferably slightly larger than the outer rings to facilitate handling.

7 Claims, 2 Drawing Figures

AIMING DEVICE

BACKGROUND OF THE INVENTION

1. Field of the Invention

The invention relates to an aiming device such as an aperture sight for a rifle.

2. Description of the Prior Art

Aiming devices of the type described herein are known for example from the German Laying Open Print DOS No. 2854996 published July 10, 1980. These types of aiming devices have performed very well since their adjustment by means of a knurled-head screw is very simple and convenient, and their adjustment means are guided in a precise and secure manner such that the aiming devices remain properly adjusted.

Users, however, have felt it to be disadvantageous that, with this type of aiming device, additional equipment was necessary for an adjustment of the brightness desired by the user. Such additional equipment may be polarizing filters as known, for example, from German Pat. No. 2007258 or color tinted glass filters which may be in the form of rotatable discs composed of a number of different color filter sections and which form humps protruding from a tubular housing to permit their rotation.

SUMMARY OF THE INVENTION

In order to provide for an arrangement in which not only the iris diaphragm of an aiming device is operated by a knurled ring surrounding the tubular housing for adjustment of the position of the diaphragm but wherein also any other adjustment such as placement of polarization and color filters into and out of their operating positions is by means of knurled operating rings, polarization filters are mounted on pivot arms, one having a pivot pin supported in the housing and the other having its pivot pin extending into an opening in a knurled operating ring surrounding the tubular housing, both polarization filters being rotatably supported relative to each other to permit relative rotation upon rotation of the knurled operating ring, said ring having also means for engaging the one arm for pivoting the filters out of the aiming device's line of sight. The color filters, if provided, are mounted on a disc rotatably supported in the housing and engaged, at its circumference, by a third operating ring which also surrounds the housing. All operating rings are disposed adjacent each other and together receive, therewithin, the aiming device housing with iris diaphragm polarization and color filter structures.

Consequently, no additional equipment has to be attached to the aiming device in line with each other (one behind the other) as it is the case with the aiming devices known in the art, but all, the adjustable iris diaphragm as well as the movable polarizing filters and, if installed, also the rotatable color filter disc are arranged closely adjacent each other. Such close spacing of the filters has the advantage that scattering and optical distortion which can hardly be avoided when the devices are spaced apart are reduced to a minimum.

Furthermore, all the equipment incorporated in the aiming device is disposed within the tubular housing and consequently it is protected from light infiltrating from the outside. With the arrangement according to the invention, it is furthermore possible to operate the polarizing filter and the coloring filters by means of adjusting rings (knurled screw, knurled disc or knurled ring) which surround the tubular housing which is very convenient for a rifleman to use while aiming. It is preferred that, of three adjacent adjusting rings, the intermediate adjusting ring has a larger diameter than the others so that accidental rotation of the adjacent adjusting rings can be avoided.

It is also pointed out that, in addition to its improved functioning, the combination aiming device is less expensive to manufacture than an apparatus with separate equipment which also has to be adjusted separately.

In order to be able to use the aiming device also at relatively low light levels, it is desirable to provide not only for the swinging out of the polarizing filter but to provide a window in the coloring filter disc for free passage of the light.

If in accordance with the invention a polarizing disc is disposed adjacent the coloring filter disc and the polarizing filter has an additional rotatable polarizing disc which may be pivoted out of the optical axis of the aiming device, it is possible not only to dampen the light entering the aiming device as desired but it is also possible to polarize or rather cut out light entering the aiming device from the side by rotating the polarizing disc.

If the combination aiming device includes an adjustable iris diaphragm, a polarizing filter and a color filter, the polarizing filter is suitably disposed between the iris diaphragm and the color filter. This arrangement facilitates cleaning of the color filter glass discs.

The rotatable disc containing the color filter is suitably provided with a circumferential gear which is in engagement with an internal gearing formed on the knurled ring, the knurled ring being supported on two rollers mounted in the tubular housing at the opposite side of the area of engagement of the rotatable disc with the knurled ring. The disc is preferably provided with a smooth roller collar arranged adjacent the gear area, which collar may be provided with notches adapted to receive a lock pin for locking the filter disc in predetermined positions. Instead of using lock pins it is possible to support at least one of the support rollers resiliently and to provide an spring which forces this roller toward the disc and into such notches.

DESCRIPTION OF THE PREFERRED EMBODIMENT

Figure 1:
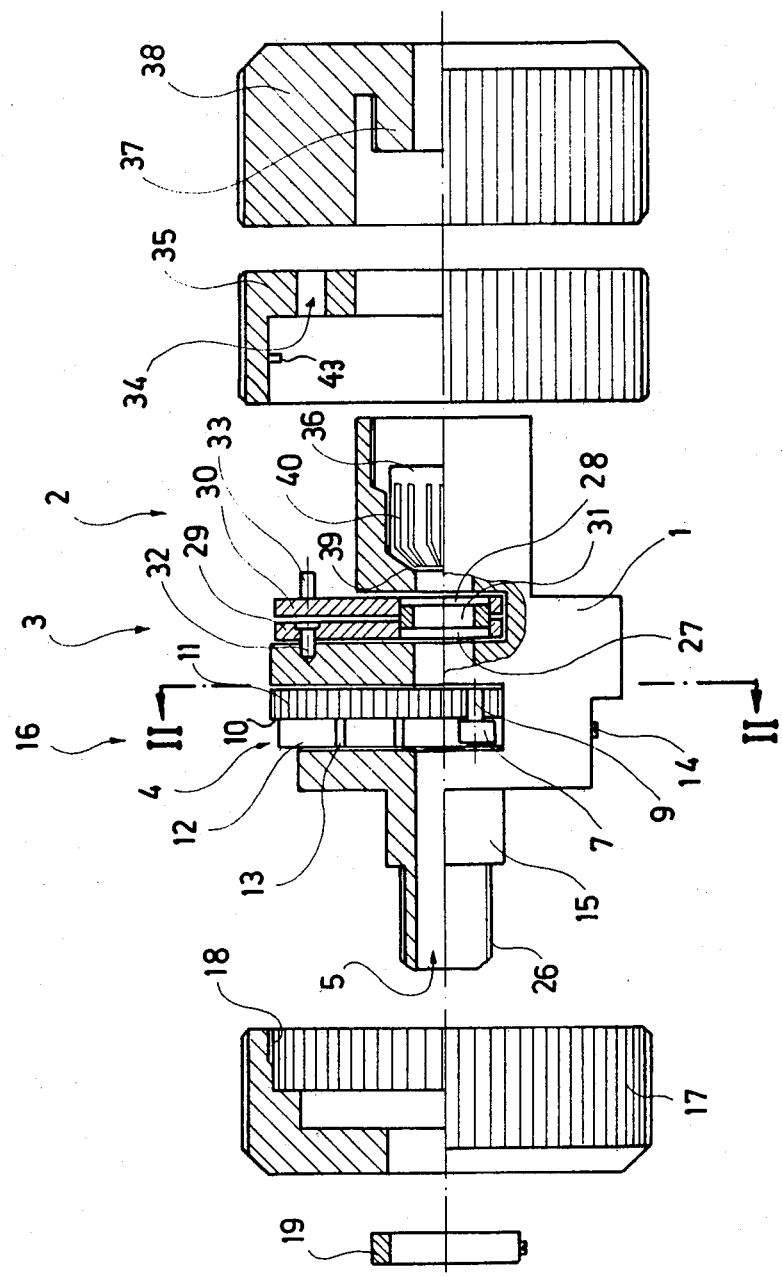
FIG. 1 is a schematic exploded view of the aiming device.
Figure 2:
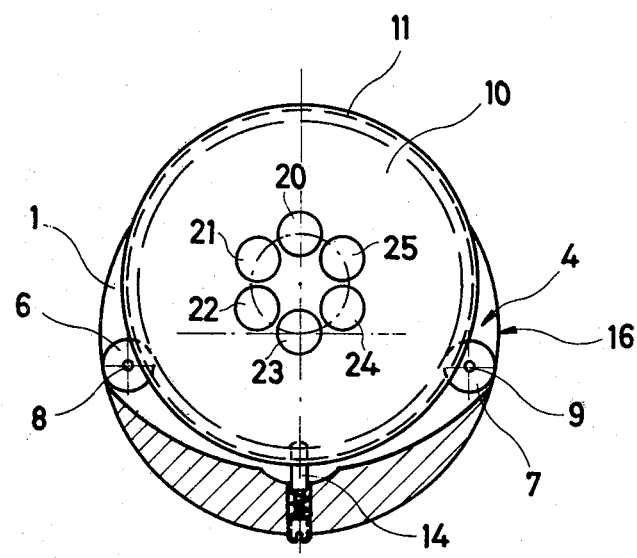
FIG. 2 is a cross-sectional view along line II—II of FIG. 1.

As shown in FIGS. 1 and 2, an aiming device comprises a tubular housing 1 enclosing an iris diaphragm 2, a polarizing filter 3 and a color filter 16. At one axial end the housing 1 is provided with a threaded end piece 26 to facilitate its mounting on a support bracket of a rifle. The housing 1 has formed therein a slot 4 receiving a color filter disc 10 which is supported in the slot 4 rotatably on rollers 6 and 7 and is provided with a circumferential gear ring 11. Adjacent the gear ring 11 there is provided a smooth collar 12 having formed therein notches 13 adapted to receive a positioning pin 14. The rollers 6 and 7 are supported on the housing 1 by means of shafts 8 and 9. The housing 1 is provided with a collar 15 on which a knurled ring 17 is rotatably supported. The knurled ring 17 is provided with internal gear ring 18 engaging the external gear ring 11 of the color filter disc 10. The knurled ring 17 is held on the collar 15 by a mounting ring 19 which may be secured by a set screw. The color filter disc 10 is provided with bores 20–25 of which bores 22 to 25 receive color filters, bore 21 receives a polarizing filter, and bore 20 is a window for free passage of light.

The polarizing filter 3 has two polarizing glass discs 27, 28 mounted on the ends of two operating levers 29, 30. The polarizing discs 27 and 28 and the operating levers 29 and 30 are operatively interconnected by means of a pivot bearing ring 31. The operating lever 29 is pivotally supported on the housing 1 by means of a mounting screw 32. A pin 33 protruding from the operating lever 30 is received in an opening 34 formed in a knurled ring 35 which is rotatably supported on the housing 1 such that rotation of the knurled ring 35 causes rotation of the polarizing discs 27, 28 relative to each other, or alternatively, pivoting of both of the discs 27, 28 out of alignment with the bore 5 of the housing 1 when the lever 29 is engaged by a stop 43 formed on the knurled ring 35. The stop 43 is so arranged that it engages the outer end of the lever 29 when the mounting screw 32 and pin 33 are in axial alignment such that rotation of the ring 35 from this position in one direction with lever 29 engaged by the stop 43 will cause pivoting of the polarizing filters 27 and 28 out of the line of sight while rotating of the ring 35 from such position in the opposite direction will cause rotation of the polarizing filters relative to each other. In order to permit such pivoting, the opening 34 in the ring 35 is somewhat larger than the pin 33 or it is radially slightly elongated.

At its free end, the housing 1 has a conical cavity receiving a sleeve 36 with radial slots providing for ribs 40 which have their free ends 39 bent inwardly toward the line of sight. A knurled operating ring 38 has a threaded shoulder 37 which is threaded into the threaded cavity of the housing 1 to abut the sleeve 36 for forcing the free ends 39 of the ribs 40 inwardly, the ribs 40 forming an iris diaphragm.

It can be easily seen from the drawings that the arrangement according to the present invention is simple and easy to manufacture. Operation and care of the aiming device are also quite simple. Adjustment of the viewing opening is possible—as is common practice—by rotation of the knurled ring 38; and adjustment of the polarizing filters 3 as well as the color filters 16 is also possible by way of knurled rings (adjacent rings 35 and 17). For cleaning the color discs 22–25 (and also the polarizing discs 27 and 28) it is only necessary to open the set screw of the mounting ring 19 and to slip out the knurled ring 17. The color filter disc 11 can then be removed and cleaned. The polarizing filter 27 can be cleaned and also the slotted sleeve 36 can be exchanged after removal of the knurled disc 38 and sliding out of the operating disc 35.

The arrangement provides altogether for an aiming device in which not only the diameter of the viewing opening is infinitely variable, but which permits also to dampen the light passing therethrough by means of polarizing filters and to predetermine the color of the light by selection of the desired filter.

What is claimed is:

1. An aiming device comprising: a tubular support housing; an adjustable iris diaphragm arranged in said housing at one end thereof and forming an eyepiece, said diaphragm consisting of an axially slotted sleeve forming ribs which are bent inwardly at their free ends, said inwardly bent free ends overlaying each other scale-like and being received in a conical opening in said housing; a rotatable operating ring threaded onto said housing and engaging said slotted sleeve for axially forcing said sleeve with its free ends into said conical opening for causing inward deflection of said free ends for adjustment of the opening of said eyepiece; a polarizing filter structure also mounted in said housing and consisting of two adjacent polarizing discs rotatably mounted relative to each other by 90°, each being supported on an operating lever, the first one being linked to said housing, and a polarizing filter control ring rotatably supported on said housing and having the end of the second polarizing filter operating level linked thereto for rotating said polarizing filters relative to each other, said filter control ring further having means for engaging the first operating lever for pivoting said lever to move the filters out of line of sight of said aiming device and a color filter disc including a number of different color filters and provided with external gearing and an operating ring mounted rotatably around said housing and provided with internal gearing in engagement with the gearing of said filter disc, and said filter disc being rotatably supported by rollers disposed in an area opposite the area of engagement of said gearings so as to permit operation thereof, all three rotatable operating rings, the color filter disc operating ring, the polarizing filter support lever operating ring and the iris diaphragm operating ring being disposed axially closely adjacent one another and rotatably around said housing.

2. An aiming device as recited in claim 1, wherein said rotatable operating rings are knurled and disposed adjacent each other and the intermediate ring has a slightly larger diameter than the adjacent outer rings.

3. An aiming device as recited in claim 1, wherein said color filter disc has also a window for unobstructed passage of light.

4. An aiming device as recited in claim 1, wherein said polarizing filter structure is disposed between said iris diaphragm and said color filter disc.

5. An aiming device as recited in claim 1, wherein said color filter disc has a smooth roller shoulder formed adjacent its circumferential gearing.

6. An aiming device as recited in claim 5, wherein said roller shoulder has grooves and said housing has a spring loaded means disposed adjacent said shoulder for engaging said grooves.

7. An aiming device as recited in claim 6, wherein said spring loaded means is a positioning pin.

* * * * *